Patented Aug. 1, 1939

2,167,678

UNITED STATES PATENT OFFICE 2,167,678

SOLDER

Giorgio Purkardhofer and Gualtiero Battilana, Trieste, Italy, assignors, by direct and mesne assignments, of two-thirds to Orestes De Martini, New York, N. Y., and one-third to Matthew Palisca, Jamaica, N. Y.

No Drawing. Application January 18, 1938, Serial No. 185,550. In Italy January 20, 1937

1 Claim. (Cl. 75—134)

This invention relates to new and useful improvements in metal alloys and more particularly it pertains to a new and novel alloy intended for use as a solder.

It is the primary object of the invention to provide a solder particularly adapted for forming bonds between aluminium and in general light alloys, either together or with other metals and their alloys.

It is a further object of the invention to provide a novel soldering alloy by which aluminium may be soldered to aluminium, or to other light alloys, or other metals and their alloys, without necessitating the use of oxy-acetylene flame or electric arc welding.

The new alloy herein set forth consists of the following metals combined in substantially the proportions given:

| | Per cent |
|---|---|
| Bismuth | 10 |
| Zinc | 42 |
| Tin | 22 |
| Lead | 23 |
| Cadmium | 2.95 |
| Silver | 0.05 |

The alloy is obtained by a progressive fusion of the several metals heretofore mentioned. The alloy is purified by adding thereto, chloride of ammonia, borax and colophony-resin, these purifying agents being added during the fusion of the several metals.

While in the foregoing description, certain definite quantities of the several metals employed have been mentioned, it is to be understood, however, that these quantities may be varied within certain latitudes in order to produce a soldering alloy for certain specific purposes as particularly where stronger or weaker soldered joints are desired.

Having thus described the invention, what is claimed as new and what it is desired to obtain by Letters Patent of the United States of America, is:

Metallic alloy suitable for the soldering of aluminium and light alloys in general, both together as well as with other metals and their alloys, consisting of the following percentage of metals, viz: bismuth 10%, zinc 42%, tin 22%, lead 23%, cadmium 2.95%, silver 0.05%.

GIORGIO PURKARDHOFER.
GUALTIERO BATTILANA.